H. B. WIER.
WATCHCASE RECEIVER.
APPLICATION FILED APR. 16, 1912.
1,102,621.
Patented July 7, 1914.
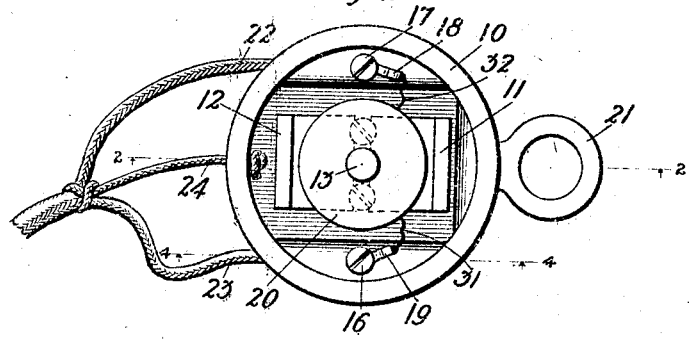
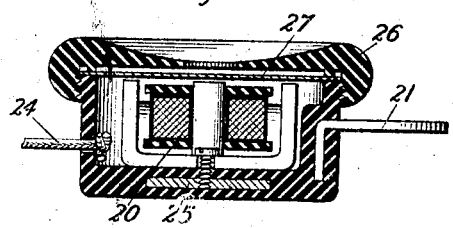
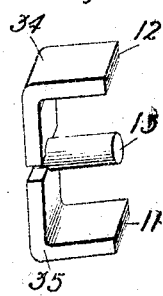
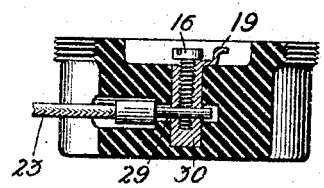
Witnesses:
M. F. Hoffman
F. Toohey
Inventor:
Harry B. Wier

UNITED STATES PATENT OFFICE.

HARRY B. WIER, OF JERSEY CITY, NEW JERSEY, ASSIGNOR TO WESTERN ELECTRIC COMPANY, OF NEW YORK, N. Y., A CORPORATION OF ILLINOIS.

WATCHCASE-RECEIVER.

1,102,621.   Specification of Letters Patent.   Patented July 7, 1914.

Application filed April 16, 1912. Serial No. 691,125.

*To all whom it may concern:*

Be it known that I, HARRY B. WIER, subject of the King of England, residing at Jersey City, in the county of Hudson and State of New Jersey, have invented a certain new and useful Improvement in Watchcase-Receivers, of which the following is a full, clear, concise, and exact description.

This invention relates to telephone receivers, and more particularly to the magnet structure thereof. Its objects are to simplify the construction and to increase the efficiency of such receivers.

The magnet structure comprises a central core and two right-angled return pole-pieces welded to the rear end of the core and extending forwardly so that the free ends of the core and of the return pole-pieces are in the same plane and adjacent to the receiver diaphragm. Preferably, the core is of soft iron and the return pole-pieces of steel forming the permanent magnets of the receiver. Like poles of these magnets are welded one on either side of the rear end of the core, and extend on either side of a spool embracing the core and carrying the energizing winding.

Other features of this invention are the details of construction and combination of parts as will hereinafter more fully appear.

In the drawings—Figure 1 is a front view of the receiver with the cap removed; Fig. 2 is a side elevation in cross-section; Fig. 3 shows the magnet system removed; and Fig. 4 is a sectional view showing the method of attaching the conductor terminals to the receiver.

Referring to Figs. 1 and 3, the magnet system consists of two right-angled permanent magnets 34 and 35. These magnets are spot welded to the soft iron core 13 so that the poles 11 and 12 of the permanent magnets are of the same polarity; likewise, the poles welded to the soft iron core 13 are of like polarity, with the result that the free end of the soft iron core 13 is of one polarity and the free ends of 11 and 12 of the permanent magnets 34 and 35 are of the opposite polarity. The faces 11 and 12 of the permanent magnets and the face of the free end of the soft iron core 13 are in the same plane; the entire system being placed so that the three faces are slightly removed from the diaphragm 27.

In the back of the shell 10 is embedded a plate 25 (Fig. 2) to which the magnet system is attached. The magnet spool 20 is placed around the soft iron core 13. The wires 22 and 23 leading into the receiver are provided with the usual tips 29 (Fig. 4), said tips being held within the receiver by the screws 16 and 17, said screws engaging the cylindrical nuts 30. These nuts are drilled for the reception of the tips 29 and are secured to the casing 10 by being embedded in an offset portion of said casing. The tops of these nuts 30 are provided with clips 18 and 19 to which are attached the magnet spool terminals 31 and 32. The supporting ring 21 is provided with a portion bent at right angles to the plane of the ring, this right-angled portion being embedded in the casing. Through a hole in the casing passes a supporting cord 24, said cord being secured by a knot. The diaphragm 27 is supported on the casing and held in place by the cap 26.

It will be noticed that, with the exception of the ring 21, there are no projections on the exterior of the receiver, giving the whole a neat appearance and reducing the liability of the receiver becoming entangled in the hair or other objects with which it may come in contact.

What I claim is:

1. In a telephone receiver of the class described, a magnet system, a receiver shell therefor, and a plate embedded in said shell for supporting the magnet system in the receiver.

2. In a telephone receiver of the class described, two right-angled permanent magnets, a soft iron core, a magnet spool, like poles of one polarity of the permanent magnets welded to one end of the soft iron core, the other poles of like polarity having their faces in the same plane with the face of the free end of the soft iron core, the magnet spool surrounding the soft iron core, a receiver shell surrounding the magnet system, and means embedded in the shell for supporting the magnet system in the receiver.

3. In a telephone receiver of the class described, right-angled permanent magnets radially disposed, a soft iron core, a magnet spool, the poles of one polarity welded to one end of the soft iron core, the faces of the free poles in the plane of the face of the free end of the soft iron core, the magnet spool surrounding the soft iron core, a receiver shell, a clamping plate embedded in the receiver shell supporting the magnet system, means embedded in the shell for supporting the receiver, and clamping means embedded in the shell for attaching the conductor leads.

In witness whereof, I hereunto subscribe my name this 15th day of April, A. D., 1912.

HARRY B. WIER.

Witnesses:
F. TOOHEY,
W. F. HOFFMAN.